Patented May 20, 1941

2,242,785

UNITED STATES PATENT OFFICE 2,242,785

MANUFACTURE OF MAGNESIA CONCRETES

Karl Kammüller, Karlsruhe-Ruppurr, and Robert Scheibe, Oberhausen-Holten, Germany No Drawing. Application November 23, 1937, Serial No. 176,056. In Germany August 10, 1936

2 Claims. (Cl. 106—29)

This invention relates to manufacture of magnesia concretes; and it comprises a process of producing magnesia concretes which includes the step of mixing together magnesium oxide, magnesium chloride, water and the usual fillers or aggregates, these ingredients being mixed in approximately the proportions by weight of 44 to 53 per cent magnesium oxide, 13 to 16 per cent of magnesium chloride and 32 to 42 per cent of water; the ratio of magnesium oxide to the fillers or aggregates being advantageously maintained within the limits of 1:3 to 1:12, and the magnesium oxide employed being usually a caustic, non-sintered product obtained by calcining a magnesite of the type of Upper Silesian magnesite at a temperature of about 900° C. Our invention also includes the novel compositions produced by the said process; all as more fully hereinafter set forth and as claimed.

The so-called Sorel cements have been known for many years. They have been employed industrially for making stuccos, flooring and other building materials, usually for interior finishing. Concretes made from these cements have found only limited use in exterior construction owing to their low resistance to weathering and their high shrinkage. Considerable difficulty with these concretes has also been encountered owing to their corrosiveness. These difficulties have been eliminated to a large extent in the concretes made in accordance with the present invention.

It has been found that certain magnesium oxides of high purity, when combined with magnesium chloride and water in certain definite proportions, are capable of producing concretes having particularly low shrinkages and high strengths and being highly resistant to the action of water and frost. These products harden rapidly and, surprisingly, have been found to be substantially non-corrosive. In order to produce concretes with these properties it has been found that the ingredients should be mixed in the proportions by weight of 44 to 53 per cent of magnesium oxide, 13 to 16 per cent of magnesium chloride and from 32 to 42 per cent of water. The optimum quantities of these ingredients, expressed in molar proportions, are 8 moles of MgO to 1 mole of $MgCl_2$ and 15 moles of $H_2O$. A filler or aggregate should be employed in sufficient quantity to produce a mix having sufficient plasticity and stiffness to be worked and handled in a practical manner. For best results the quantity of filler or aggregate used should be such that the ratio of magnesium oxide to filler or aggregate falls within the limits of 1:3 to 1:12; this ratio varying, of course, with the type and porosity of the filler. Concrete mixes and mortars can be made within these limits which can be applied satisfactorily by usual methods and which produce concretes having the advantageous properties which have been mentioned.

In making concretes in accordance with the present invention it is advantageous to employ high-grade aggregates, such as carborundum, chromium slag, copper slag, iron turnings and the like. And it is possible to make full use of the inherent strength of these materials. We attribute this fact to the extremely low volume change of our compositions and to the consequent formation of a firm and permanent bond with the aggregate which is employed. It is well known that, in the usual hydraulic and magnesia concretes, it is not possible to produce firm bonds between the cements and the aggregates owing to the high volume changes which occur upon setting and ageing. The result is that failure always takes place at the interface between the cement and the aggregate and the inherent strength of the aggregate consequently contributes but little to the strength of the concrete as a whole. The results obtained with the present concretes are therefore quite unexpected.

When iron or steel inserts or reinforcements are employed with the concretes of the present invention a firm mechanical union is produced between the iron or steel and the concrete. The resulting strengths which can be obtained are far above those hitherto attainable with hydraulic cements employing the same reinforcing materials. And we have found that no appreciable corrosion of metal inserts takes place with our concretes, a result which is contrary to the usual experience with magnesia cements.

It is important that the magnesium oxide employed in the present invention be of high purity and also that relatively low temperatures be employed in its production. It has been found that best results are obtained with caustic, non-sintered magnesia produced by the calcination of a magnesite of the type of Upper Silesian magnesite at a temperature of about 900° C. Long storage of the magnesia has been found to be detrimental. Of course, it is possible at times to obtain concretes of considerable strength with magnesia produced from magnesite of a type somewhat different from that of the Upper Silesian magnesite, with magnesia produced at calcining temperatures considerably above or below 900° C. and with magnesia which has been stored for considerable periods of time, but the concretes produced with these other materials vary greatly in properties and usually have high volume changes which in time diminish their strengths. Moreover these materials usually produce optimum strengths only within narrow ranges of proportions.

It has been found that calcined Zillertal magnesite, for example, produces favorable results only when the magnesium chloride solution is carefully maintained at a concentration of about 26.5 per cent. A slight change in the constituents of the mixture, such as frequently occur at any building site, results in the production of concretes having unfavorable shrinkage characteristics.

When temperatures higher than 900° C. are employed in calcining magnesite, during the production of magnesia, it has been found that the concretes produced from the resulting magnesia have the property of setting very rapidly, which greatly restricts their utility. Extensive tests conducted with samples of magnesia derived from various magnesites have uniformly yielded results which were inferior to those obtained with magnesia from Upper Silesian magnesite, calcined at a temperature of about 900° C. Great variability in volume change characterized all of the concretes produced with these other materials. Upper Silesian magnesite has approximately the following composition:

|  | Per cent |
|---|---|
| MgO | 92 |
| CaO | 1.5 |
| $SiO_2$ | 2.5 |
| Loss upon ignition | 4 |

We have found that the low resistance to moisture, which is characteristic of most magnesia cements, is largely dependent upon the type of magnesite from which the magnesia is derived and upon the temperatures employed during calcination. In the case of concretes made from magnesia produced at temperatures considerably above or below 900° C. it has been found that, upon immersion in water, these concretes absorb water to a considerable extent and expand greatly. The internal disruptive forces which are caused thereby lead to cracks and eventually to the disintegration of these concretes. The importance of carefully selecting the type of magnesite employed in making magnesia for cements and of properly controlling the calcining temperature is thus evident.

In concretes which are produced in accordance with the present invention, it has been found that volume changes, due to absorption of water, take place only when the concretes are relatively new and that these changes do not exceed those which occur with concretes made from hydraulic cements. It has been found, surprisingly, that the concretes of the present invention lose their tendency to absorb moisture within a period of several months. In one particular experiment it was found that a concrete test prism, which was one year old, showed no measurable change in volume after being immersed in water over a period of six weeks. This is believed to be a new result in magnesia concretes.

In one specific process, which represents a practical method of making concretes within the present invention, we employed a magnesia obtained by calcining Upper Silesian magnesite at a temperature of about 900° C. This was mixed with a graded aggregate in the ratio of from about 1:5 to 1:6. A magnesium chloride solution was then mixed in having a concentration between 28 and 29 per cent $MgCl_2$ by weight, the quantity of solution added being such that approximately 300 parts of anhydrous $MgCl_2$ were present per 1000 parts of magnesia. The resulting mortar was found to be satisfactorily plastic for application in practice. It was found to set after about four hours and several hours later a considerable hardening had already taken place. Test blocks made from this concrete were found to have a crushing strength of more than 100 kilograms per square centimeter only 8 to 9 hours after mixing. After 24 hours the crushing strength was found to be 500 kilograms per square centimeter and after 3 days this strength had reached the value of 900 to 1000 kilograms per square centimeter. After four days the strength increased only slowly.

The tensile strengths of our concretes amount to from about $1/12$ to $1/15$ of the crushing strengths, while the bending strengths are about twice the tensile strengths. These values, of course, depend upon the type of aggregate employed.

The volume change, shown by our concrete, measured from the tenth hour to the maximum on the 8th to 10th day amounts to about 0.2 mm. per meter. From this point on the volume change falls to about 0.15 mm. per meter. The weights of the mix and of the final concrete are practically the same which shows that the mix does not lose any appreciable water during hardening.

The short hardening time of our concretes, their high mechanical strengths and their ability to withstand weathering make these concretes particularly suited for exterior structures and out-door finishing. They are useful wherever quick setting compositions of high mechanical strength are required.

While we have outlined what we consider to be the more advantageous embodiments of the present invention, it is evident that many variations may be made in the procedures set out without departing from the purview of the present invention. For example, it is possible to employ all the common types of aggregate or fillers with our compositions, including hair, calcite, silex, talc, sawdust, asbestos, sand, limestone, chalk, marble, china clay, pigments, etc. It is advantageous to have this aggregate properly graded with suitable proportions of finely divided and coarse particles. Alundum or other abrasives may be added in order to increase the wear resistance of our concretes. The magnesium chloride can be added to the mix either in the form of a solution or in the form of dry flakes or crystals. Other modifications within the scope of the following claims will be immediately evident to those skilled in the art.

What we claim is:

1. The composition comprising a mixture of magnesium chloride, water and a caustic, non-sintered magnesia in approximately molar proportions of 8 moles of magnesium oxide, 1 mole of magnesium chloride and 15 moles of water.

2. The process of manufacturing a weather resistant magnesia cement of high strength and low shrinkage and low volumetric change and capable of permanent bond with aggregate and reenforcement comprising mixing together eight mols of a caustic non-sintered magnesium oxide of high purity produced by the calcination of a magnesite of the type of an Upper Silesian magnesite, one mol of magnesium chloride and fifteen mols of water.

KARL KAMMÜLLER.
ROBERT SCHEIBE.